(12) United States Patent
Li et al.

(10) Patent No.: US 12,347,177 B2
(45) Date of Patent: Jul. 1, 2025

(54) METHOD AND DEVICE FOR 3D OBJECT DETECTION

(71) Applicant: Nokia Technologies Oy, Espoo (FI)

(72) Inventors: Yazhao Li, Tianjin (CN); Dayu Jia, Tianjin (CN)

(73) Assignee: Nokia Technologies Oy, Espoo (FI)

( * ) Notice: Subject to any disclaimer, the term of this patent is extended or adjusted under 35 U.S.C. 154(b) by 457 days.

(21) Appl. No.: 17/995,932

(22) PCT Filed: Apr. 23, 2020

(86) PCT No.: PCT/CN2020/086439
§ 371 (c)(1),
(2) Date: Oct. 11, 2022

(87) PCT Pub. No.: WO2021/212420
PCT Pub. Date: Oct. 28, 2021

(65) Prior Publication Data
US 2023/0196801 A1    Jun. 22, 2023

(51) Int. Cl.
*G06V 10/82*    (2022.01)
*G06T 7/593*    (2017.01)
(Continued)

(52) U.S. Cl.
CPC .............. *G06V 10/82* (2022.01); *G06T 7/593* (2017.01); *G06T 7/73* (2017.01); *G06V 10/42* (2022.01);
(Continued)

(58) Field of Classification Search
CPC .. G06V 10/806; G06V 10/82; G06V 10/7715; G06V 20/64; G06V 10/42; G06T 7/73; G06T 7/593
See application file for complete search history.

(56) References Cited

U.S. PATENT DOCUMENTS

2017/0038466 A1    2/2017  Salmen et al.
2018/0038689 A1    2/2018  Takemura et al.
(Continued)

FOREIGN PATENT DOCUMENTS

CN    110472534 A    11/2019
CN    110543858 A    12/2019
(Continued)

OTHER PUBLICATIONS

Journal of Physics: Conference Series, vol. 1544, Issue 1, article id. 012134 (2020). Mingchi Feng et al. (Year: 2020).*
(Continued)

*Primary Examiner* — Gregory A Morse
*Assistant Examiner* — Ty Mitchell Beatty
(74) *Attorney, Agent, or Firm* — Nokia Technologies Oy

(57) ABSTRACT

A method and device for 3D object detection. The method comprises the steps of: generating one or more fused images (201) based on a pair of images(530), the pair of images (530) including a left view image(101,710*a*) and a right view image(102,710*b*); extracting one or more fused features from the fused images(201) by a single backbone network(210) of a share network with feature unmixing (SNFU,540); unmixing the fused features to a left view-aware feature and a right view-aware feature by a feature unmixing sub-network(220) of the SNFU(540); predicting the 3D object based on the left view-aware feature and the right view-aware feature; and determining spatial features of the predicted 3D object. The proposed method and device can reduce the computation complexity to the level of that in monocular based 2D object detection so as to improve the computation efficiency while keeping high precision. In addition, the PCNet network for depth estimation can achieve the competitive performance on accuracy and high (Continued)

speed simultaneously when predicting the depth of the 3D object.

22 Claims, 12 Drawing Sheets

(51) Int. Cl.
　　　*G06T 7/73*　　　(2017.01)
　　　*G06V 10/42*　　(2022.01)
　　　*G06V 10/77*　　(2022.01)
　　　*G06V 10/80*　　(2022.01)
　　　*G06V 20/64*　　(2022.01)
(52) U.S. Cl.
　　　CPC ........ *G06V 10/7715* (2022.01); *G06V 10/806* (2022.01); *G06V 20/64* (2022.01); *G06T 2207/10012* (2013.01); *G06T 2207/20084* (2013.01); *G06T 2207/20221* (2013.01); *G06T 2207/30252* (2013.01)

(56) References Cited

U.S. PATENT DOCUMENTS

| | | |
|---|---|---|
| 2019/0026956 A1 | 1/2019 | Gausebeck et al. |
| 2019/0188451 A1 | 6/2019 | D'Ercoli et al. |
| 2019/0295282 A1 | 9/2019 | Smolyanskiy et al. |
| 2019/0392192 A1 | 12/2019 | Dubey et al. |

FOREIGN PATENT DOCUMENTS

| | | |
|---|---|---|
| GB | 2555214 A | 4/2018 |
| WO | 2020/056431 A1 | 3/2020 |

OTHER PUBLICATIONS

Lehky SR. Unmixing binocular signals. Front Hum Neurosci. Aug. 9, 2011;5:78. doi: 10.3389/fnhum.2011.00078. PMID: 21886618; PMCID: PMC3152723. (Year: 2011).*
Li et al., "Stereo R-CNN based 3D Object Detection for Autonomous Driving", Proceedings of the IEEE/CVF Conference on Computer Vision and Pattern Recognition (CVPR), 2019, pp. 7644-7652.
Wang et al., "Pseudo-LiDAR from Visual Depth Estimation: Bridging the Gap in 3D Object Detection for Autonomous Driving", Proceedings of the IEEE/CVF Conference on Computer Vision and Pattern Recognition (CVPR), 2019, pp. 8445-8453.
Pon et al., "Object-Centric Stereo Matching for 3D Object Detection", arXiv, Mar. 10, 2020, 7 pages.
You et al., "Pseudo-LiDAR++: Accurate Depth for 3D Object Detection In Autonomous Driving", arXiv, Feb. 15. 2020, pp. 1-22.
Qin et al., "Triangulation learning network: from monocular to stereo 3d object detection", arXiv, Jun. 4, 2019, 9 pages.
Chen et al., "3D object proposals for accurate object class detection", Advances in Neural Information Processing Systems (NIPS), 2015, pp. 1-9.
Li et al., "GS3D: An Efficient 3D Object Detection Framework for Autonomous Driving", Proceedings of the IEEE/CVF Conference on Computer Vision and Pattern Recognition (CVPR), 2019, pp. 1019-1028.
Königshof et al., "Realtime 3D Object Detection for Automated Driving Using Stereo Vision and Semantic Information", IEEE Intelligent Transportation Systems Conference (ITSC), Oct. 27-30, 2019, pp. 1405-1410.
Luo et al., "3D-SSD: Learning Hierarchical Features From RGB-D Images for Amodal 3D Object Detection", arXiv, Feb. 21, 2018, 9 pages.
Luo et al., "Object Detection Based on Binocular Vision with Convolutional Neural Network", Proceedings of the 2018 International Conference on Signal Processing and Machine Learning, Nov. 2018, pp. 60-65.
Ren et al., "Accurate Single Stage Detector Using Recurrent Rolling Convolution", Proceedings of the IEEE Conference on Computer Vision and Pattern Recognition (CVPR), 2017, pp. 5420-5428.
Cai et al., "A Unified Multi-scale Deep Convolutional Neural Network for Fast Object Detection", arXiv, Jul. 25, 2016, pp. 1-16.
Mayer et al., "A large dataset to train convolutional networks for disparity, optical flow, and scene flow estimation", IEEE Conference on Computer Vision and Pattern Recognition (CVPR), Jun. 27-30, 2016, pp. 4040-4048.
Kendall et al., "End-to-end learning of geometry and context for deep stereo regression", Proceedings of the IEEE International Conference on Computer Vision (ICCV), 2017, pp. 66-75.
Ren et al., "Pyramid Stereo Matching Network", Proceedings of the IEEE Conference on Computer Vision and Pattern Recognition (CVPR), 2018, pp. 5410-5418.
Zhang et al., "GA-Net: Guided Aggregation Net for End-To-End Stereo Matching", Proceedings of the IEEE/CVF Conference on Computer Vision and Pattern Recognition (CVPR), 2019, pp. 185-194.
Menze et al., "Object scene flow for autonomous vehicles", Proceedings of the IEEE Conference on Computer Vision and Pattern Recognition (CVPR), 2015, pp. 3061-3070.
Ranft et al., "Modeling arbitrarily oriented slanted planes for efficient stereo vision based on block matching", 17th International IEEE Conference on Intelligent Transportation Systems (ITSC), Oct. 8-11, 2014, pp. 1941-1947.
Guo et al., "Group-wise Correlation Stereo Network", Proceedings of the IEEE/CVF Conference on Computer Vision and Pattern Recognition (CVPR), 2019, pp. 3273-3282.
Huang, "Stereo Matching by Deep Learning", Slide Share, Scribd, May 9, 2019, pp. 1-12.
Yee et al., "Fast Deep Stereo with 2D Convolutional Processing of Cost Signatures", arXiv, Mar. 8, 2019, 7 pages.
Cheng et al., "Learning Depth with Convolutional Spatial Propagation Network", arXiv, Oct. 4, 2019, pp. 1-18.
Yeon Shin et al., "Depth Map Estimation Model with Efficient Feature Extraction Module", International Conference on Electronics, Information, and Communication (ICEIC), Jan. 22-25, 2019, 2 pages.
International Search Report and Written Opinion received for corresponding Patent Cooperation Treaty Application No. PCT/CN2020/086439, dated Jan. 26, 2021, 11 pages.
Extended European Search Report received for corresponding European Patent Application No. 20932632.1, Nov. 8, 2023, 11 pages.
Wang et al., "3D LiDAR and Stereo Fusion using Stereo Matching Network with Conditional Cost Volume Normalization", IEEE/RSJ International Conference on Intelligent Robots and Systems (IROS), Nov. 4-8, 2019, pp. 5895-5902.
Ghamisi et al., "Multisource and Multitemporal Data Fusion in Remote Sensing: A Comprehensive Review of the State of the Art", IEEE Geoscience and Remote Sensing Magazine, vol. 7, No. 1, Mar. 2019, pp. 6-39.

* cited by examiner

METHOD AND DEVICE FOR 3D OBJECT DETECTION

RELATED APPLICATION

This application was originally filed as PCT Application No. PCT/CN2020/086439, filed on Apr. 23, 2020, which is incorporated herein by reference in its entirety.

FIELD OF THE INVENTION

The present disclosure generally relates to image processing, and more specifically, to a method and device for three-dimension (3D) object detection.

BACKGROUND 3D object detection is an important computer vision task in various applications such as Human-Machine Interaction, Security Surveillance, and Advanced Driver Assistant Systems (ADAS). Different from general monocular based 2D object detection in which only 2D information (box coordinates) in the image are provided, 3D objects are detected to provide detailed 3D localization information containing a set of object size, orientation, and depth, or a set of height, width, and depth in real-world scenes. Depth estimation is a classical computer vision problem which describes the distance between observation point and objects. Especially in the situation of Autonomous Driving, it is significant to detect the 3D object precisely, especially get the information of depth can avoid the accident of autonomous vehicle crashing into car and pedestrian. Meanwhile, the depth information is also helpful in detection and segmentation tasks. So the accuracy and the speed are two important points which we concern the most.

To implement 3D object detection, LiDAR (Light Detection and Ranging) or stereo cameras can be adopted. Depth information obtained by LiDAR is super-accurate. In consideration that LiDAR is much more expensive than stereo cameras, binocular 3D object detection based on stereo camera is much promising in practical applications.

Deep learning become one of the most popular technology which can be used in Computer Vison (CV) and Natural Language Processing (NLP). In the past few years with the development of deep learning, the performance of self-driving and robotics has improved a lot on both accuracy and speed. Deep learning is also used in 3D object detection. In Computer Vision, the architecture called Convolutional Neural Network (CNN) which is based on deep learning is used widely.

However, considering a pair of images input for 3D object detection, the computation devices need to process two images for once 3D prediction, which doubles the computation complexity and amount when comparing with monocular based 2D object detection by using single image.

In addition, although the price of stereo camera is satisfied in application, classical stereo depth estimation methods are not satisfied on both accuracy and efficiency. Existing deep learning stereo depth estimation methods achieve good accuracy but low efficiency for involving to many 3D convolutional layers which cost a lot of computation.

Thus, there is a need for improving the method and device for 3D object detection.

SOME EXAMPLE EMBODIMENTS

To overcome the problem described above, and to overcome the limitations that will be apparent upon reading and understanding the prior arts, the embodiments of present disclosure provide a method and device for 3D object detection.

According to the first aspect of the disclosure, a method for 3D object detection is presented. The method comprises the steps of: generating one or more fused images based on a pair of images, the pair of images including a left view image and a right view image; extracting one or more fused features from the fused images by a single backbone network of a share network with feature unmixing (SNFU); unmixing the fused features to a left view-aware feature and a right view-aware feature by a feature unmixing sub-network of the SNFU; predicting the 3D object based on the left view-aware feature and the right view-aware feature; and determining spatial features of the predicted 3D object.

According to an exemplary embodiment, the pair of images is obtained by a stereo camera.

According to an exemplary embodiment, generating one or more fused images based on the pair of images further comprises: generating one or more fused images by concatenating the channels of the left and right view images along respective channel dimensions.

According to an exemplary embodiment, the backbone network comprises an input convolutional block and one or more downsampling convolutional blocks which are connected in sequence, the input convolutional block being configured to receive the fused images, the downsampling convolutional blocks, each of which comprises at least one convolutional layer, being configured to generate one or more fused features comprising image features with different spatial sizes.

According to an exemplary embodiment, unmixing the fused feature to the left view-aware feature and the right view-aware feature further comprises: generating left initial view-aware features and right initial view-aware features based on the fused features by a self-feature unmixing module (SFUM) of the feature unmixing sub-network; and generating left view-aware features and right view-aware features based on the left initial left view-aware features and the right initial view-aware features by a guided-feature unmixing module (GFUM) of the feature unmixing sub-network.

According to an exemplary embodiment, generating the left initial view-aware features and the right initial view-aware features based on the fused features further comprises: extracting global size image features from the fused features by a global average pooling operation and full convolution operations; and generating the left initial view-aware features and the right initial view-aware features by reweighting different channels of the global size image features.

According to an exemplary embodiment, the different channels of the global size image features are reweighted by element-wise multiplying the global size image features by the fused features, respectively.

According to an exemplary embodiment, generating the left view-aware features and the right view-aware features based on the left initial left view-aware features and the right initial view-aware features further comprises: downsampling the left and right view images according to the spatial sizes of the image features of the fused features, respectively; generating spatial position information for the 3D object in the left and right view images respectively; and generating the left and right view-aware features, based on the spatial position information for the 3D object in the left view image and the right view image, and the left initial view-aware features and the right initial view-aware features, respectively.

According to an exemplary embodiment, the left view-aware features are generated by element-wise multiplying the spatial position information for the 3D object in the left view image by the left view image, and the right view-aware features are generated by element-wise multiplying the spatial position information for the 3D object in the right view image by the right view image.

According to an exemplary embodiment, at least one of the backbone network and the feature unmixing sub-network is convolution neutral network.

According to an exemplary embodiment, the backbone network is selected from the group consisted of ResNet, VGG, DenseNet, and search-based network.

According to an exemplary embodiment, the SNFU is trained based on a training data set prior to be used for extracting the fused features from the fused images and/or for unmixing the fused features to a left view-aware feature and a right view-aware feature.

According to an exemplary embodiment, the spatial features of the 3D object comprise a height, a width, and a depth of the 3D object, determining spatial features of the predicted 3D object further comprises: determining the depth of the 3D object based on the height and the width of the 3D object predicted in the left and right view images, by a paired channel cost volume network (PCNet).

According to an exemplary embodiment, determining the depth of the 3D object based on the height and the width of the 3D object predicted in the left and right view images further comprises: extracting feature maps of the left and right view images from the left and right view images, by a feature extraction sub-network of the PCNet; generating a coarse disparity based on the channels of the feature maps of the left and right view images, by a paired channel module of the PCNet; refining the coarse disparity to a fine disparity; and transforming the fine disparity to the depth of the 3D object.

According to an exemplary embodiment, determining the depth of the 3D object based on the height and the width of the 3D object predicted in the left and right view images further comprises: generating a coarse disparity based on the channels of the feature maps of the left and right view images, by a paired channel module of the PCNet, wherein the feature maps of the left and right view images are the fused features extracted by the backbone network or the left and right view-aware features unmixed by the feature unmixing sub-network, respectively; refining the coarse disparity to a fine disparity; and transforming the fine disparity to the depth of the 3D object.

According to an exemplary embodiment, the paired channel module has a spatial pyramid pooling structure with three parallel paired channel feature volumes and three paired channel filters with different spatial sizes, generating a coarse disparity based on the channels of the feature maps of the left and right view images further comprises: generating the three parallel paired channel feature volumes by concatenating the channels of the feature map of the left view image and the corresponding channels of feature map of the right view images along channel dimensions of height and width of the predicted 3D object and color of the left and right view images respectively; and extracting the coarse disparity from the three parallel paired channel features volumes by respective paired channel filters.

According to an exemplary embodiment, the feature extraction sub-network comprises two stacked hourglass structure with dense connection configured to extract the feature maps of the left and right view images from the left and right view images.

According to an exemplary embodiment, the coarse disparity is refined to a fine disparity by at least one stacked residual block constructed by 2D convolution layers.

According to an exemplary embodiment, the PCNet is trained based on a training data set prior to be used for determining the disparity of the 3D object based on the height and the width of the 3D object predicted in the left and right view images.

According to an exemplary embodiment, the PCNet is a convolution neutral network.

According to the second aspect of the disclosure, a device for 3D object detection is presented. The device comprises: a fused image generation unit configured to generate one or more fused images based on a pair of images, the pair of images including a left view image and a right view image; a share network with feature unmixing (SNFU), the SNFU comprising a single backbone network configured to extract one or more fused features from the pair of images and a feature unmixing sub-network configured to unmix the fused features to a left view-aware feature and a right view-aware feature; a prediction unit configured to predict the 3D object based on the left view-aware feature and the right view-aware feature; and an object determination unit configured to determine spatial features of the predicted 3D object.

According to the third aspect of the disclosure, a non-transitory computer-readable storage medium is presented. The non-transitory computer-readable storage medium stores instructions which, when executed by one or more processor, cause the processor to perform the method above-mentioned in the first aspect of the disclosure.

The method and device by using the Share Network of SNFU to implement efficient 3D object detection reduces the computation complexity to the level of that in monocular based 2D object detection, so as to improve the computation efficiency while keeping high precision. Even for multi-view system with multiple cameras, the proposed method and device can implement 3D object detection as efficient as monocular based 2D object detection. In addition, the PCNet network for depth estimation for 3D object can achieve both the competitive performance on accuracy and high speed when predicting the depth of 3D object, so as to achieve better performance in the autonomous driving system.

Still other aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details may be modified in various obvious respects, all without departing from the spirit and scope of the disclosure. Accordingly, the drawings and description are to be regarded as illustrative in nature, and not as restrictive.

BRIEF DESCRIPTION OF THE DRAWINGS

The exemplary embodiments of the disclosure are illustrated by way of example, and not by way of limitation, in the figures of the accompanying drawings.

DETAILED DESCRIPTION OF THE INVENTION

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

There are some monocular based 3D object detection methods which directly estimates the 3D information of the objects from a single-view image. However, single-view image only contains 2D information which limits the 3D performance seriously. Using LiDAR is much more expensive in practice. Different from monocular and LiDAR based methods, binocular based methods detect objects using paired images which helps recover the stereo information of practical scenes.

In order to implement 3D object detection by taking two networks each of which is responsible for processing a single-view image, some researchers propose a Stereo-RCNN or a 3DOP neutral network method. Other researchers also propose Pseudo-Lidar based methods to use a two-stream network to generate pseudo LiDAR points and use a LiDAR-based method to predict 3D information of objects. In the two-stream network solutions, a TLNet that adopts two networks to process the paired images separately is an optional approach.

Figure 1:
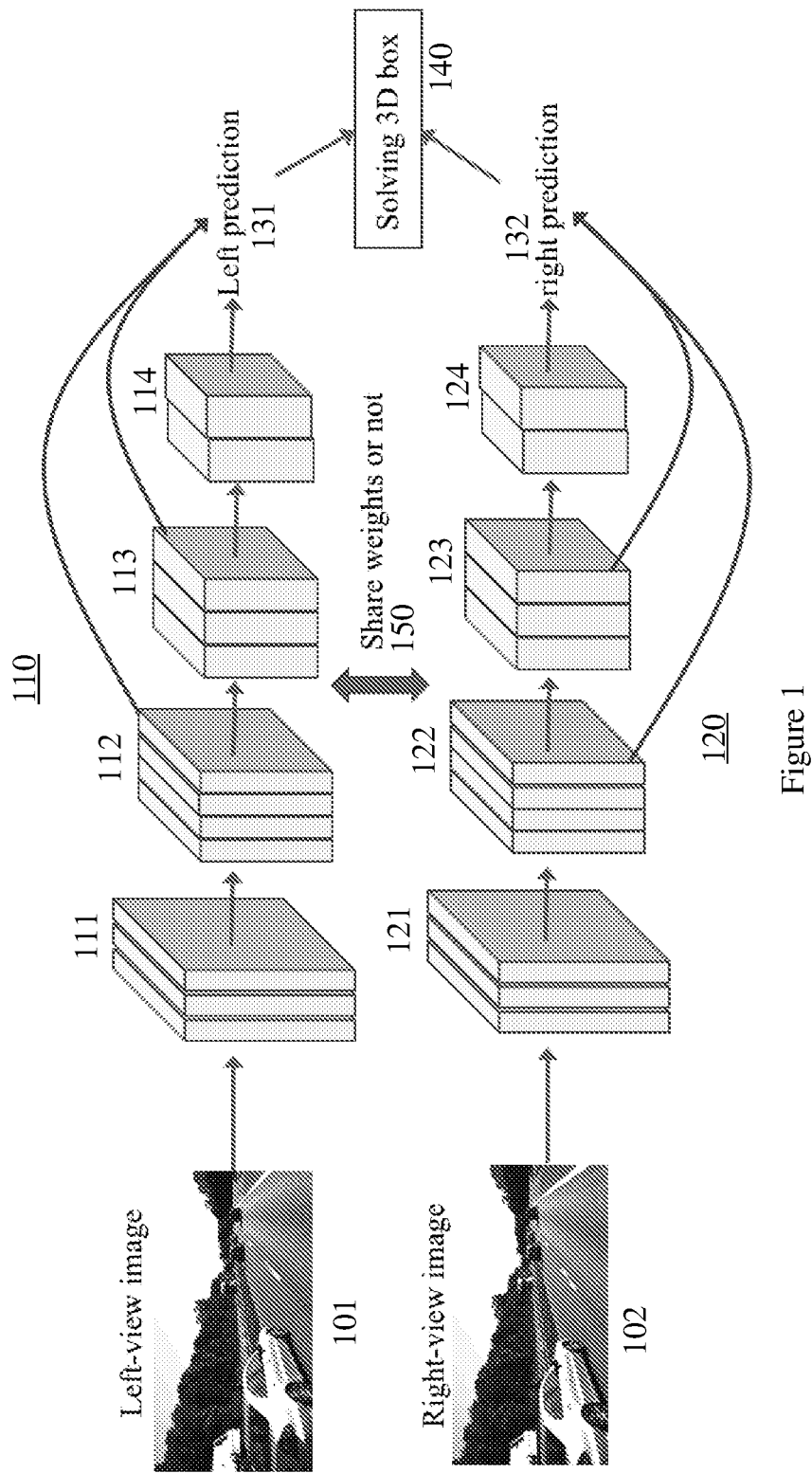
FIG. 1 illustrates a diagram of an exemplary framework of binocular-based TNet method for 3D object detection.

FIG. 1 illustrates a typical framework of binocular-based methods, called TNet, using two networks for 3D object detection. The TNet method is a binocular based 3D object detection method with deep Convolutional Neural Networks (CNN), where a pair of images, i.e., the left-view image 101 and the right-view image 102 are inputted to two networks 110, 120 (also called as two-stream network) for feature extraction and result prediction. The network 110 comprises four convolution blocks of 111, 112, 113, and 114, and the network 120 comprises another four convolution blocks of 121, 122, 123, and 124. The output of network 110 is fed to left prediction 131 to obtain the predicted object in left view. The prediction contains results for keypoint regression, 2D box coordinates, orientation which are important for solving 3D information. This processing is carried out for network 120 similarly. The predicted object by left and right predictions are used together to solve the 3D box 140 (i.e. 3D bounding box) in the binocular images. Although the two network 110 and 120 may share weights 150, it is noted that each network is responsible for feature extraction of a single-view image. That is, the computation complexity is doubled for paired inputs, which limits the application of 3D object detection in real-time scenarios. Especially, in multi-view system, the computation consumption will be doubled and redoubled. However, in practical applications like autonomous driving, fast real-time object detection and strategy adjusting are needed. Based on the observation that in these paired images the appearance and pixel values of the same object are similar, using two networks to process two images separately is time-consuming and non-optimal.

To meet the practical demands, the exemplary embodiment of present disclosure proposes a Share Network with Feature Unmixing (called as SNFU) method as an image segmentation approach for binocular based 3D object detection, which helps to reduce the computation complexity dramatically while keeping the detection precision and improving the detection efficiency. The SNFU processes paired images and embeds with the feature unmixing method to generate separate-view features for subsequent prediction. In SNFU, for a pair of images, a single share backbone network is used to extract the one or more general fused features. Then a light-weight feature unmixing sub-network by embedding a self-feature unmixing module (called as SFUM) and a guided-feature unmixing module (called as GFUM) separates the one or more fused features to left-view and right-view (view-aware) features. Subsequently, these view-aware features are used for 3D prediction. Because only one share backbone network instead of two networks is used for feature extraction, about 50% computation complexity is cut down in comparison to TNet-based solutions. SNFU method and device can reduce the redundant computation for similar features while the unmixing modules help to separate multi-view features, such that the proposed solution can improve the detection efficiency dramatically and keeping detection precision, which is much suitable for practical applications.

Figure 2:
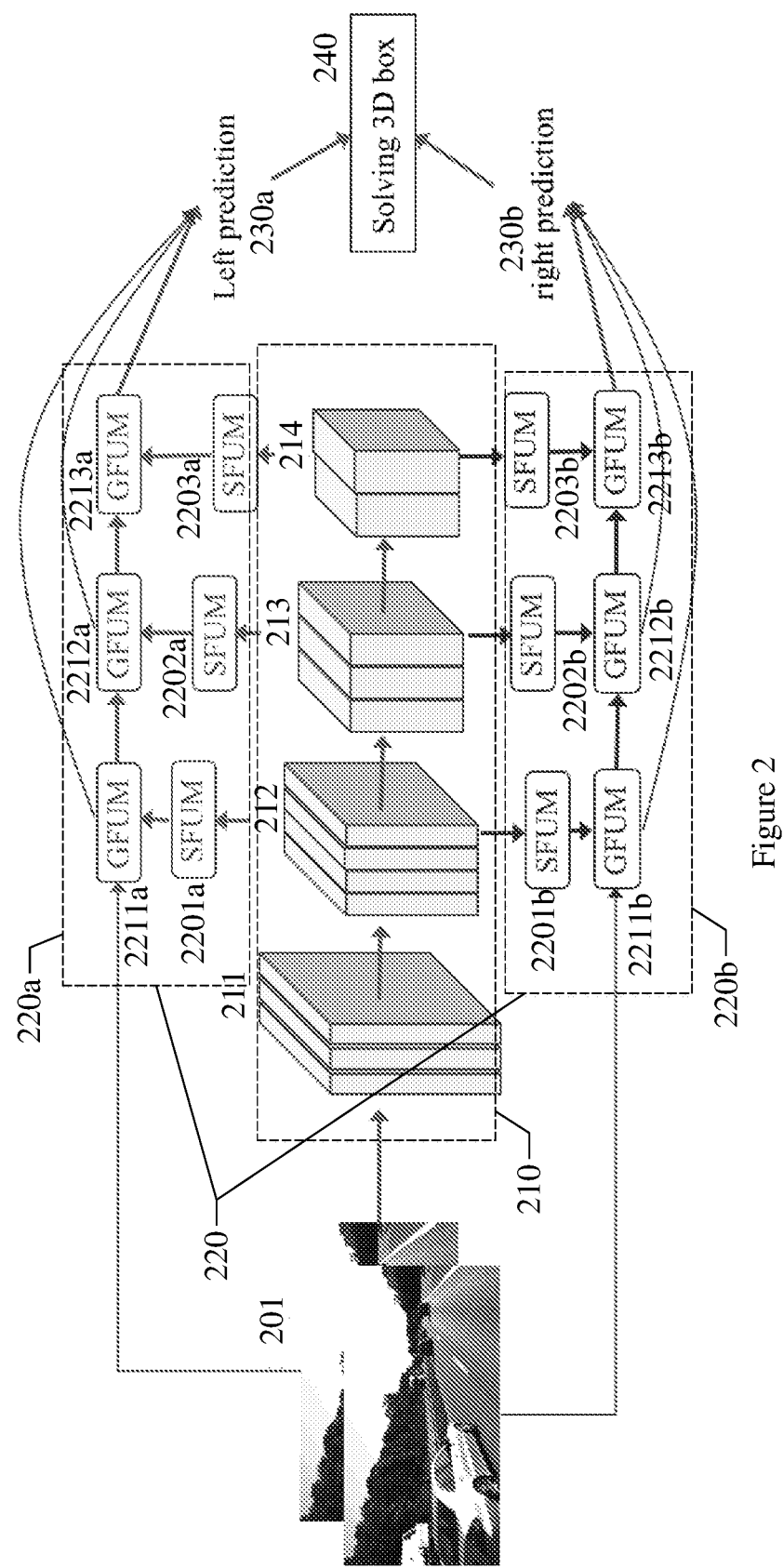
FIG. 2 illustrates a diagram of a framework of binocular-based SNFU method for 3D object detection according to an exemplary embodiment of present disclosure.
Figure 3:
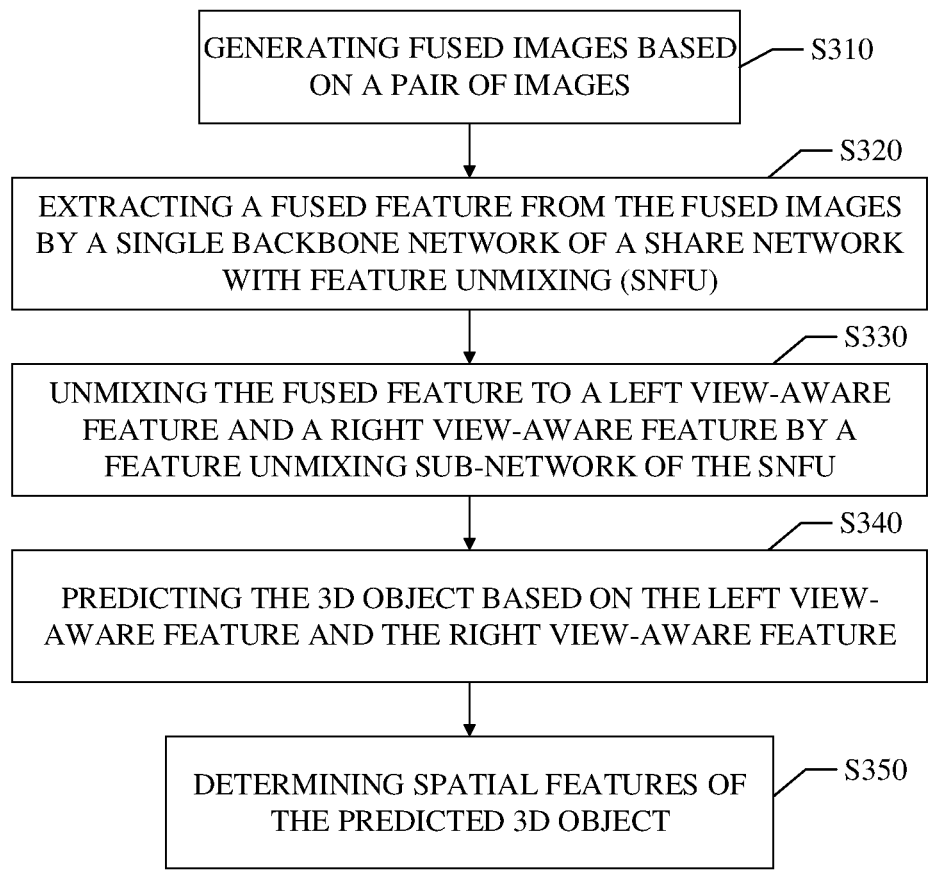
FIG. 3 illustrates a flow chart of the method based on a share network of SNFU for 3D object detection according to an exemplary embodiment of present disclosure.

The 3D object detection process according to an exemplary embodiment of the disclosure is introduced in details below with reference to FIGS. 2 and FIG. 3, where FIG. 2 illustrates the diagram of a framework of binocular-based SNFU method and FIG. 3 is the exemplary flow chart of the SNFU method.

The share network of SNFU has a single backbone network 210 and a light-weighted feature unmixing sub-network 220 including an upper part 220a and a lower part 220b. The feature unmixing sub-network 220 further comprises a self-feature unmixing module (SFUM) 2201a,

2202a, 2203a, 2201b, 2202b, and 2203b, and a guided-feature unmixing module (GFUM) 2211a, 2212a, 2213a, 2211b, 2212b, and 2213b.

Firstly, a pair of images including a left view image and a right view image are obtained and used for generating one or more fused images as the input of the share network of SNFU, in step S310. The pair of binocular based images can be obtained by a stereo camera, such as paired cameras or multi-view cameras, in which the left view image is obtained by the left camera and the right view image is obtained by the right camera.

The obtained images are 2D images including 3D information of objects. The 3D information is represented by the RGB color channels. The left and right view images have total six RGB color channels (can also be called as channel dimensions), i.e., Red, Green, and Blue color channels of the left one, and Red, Green, and Blue color channels of the right one. These six channels include enough 3D information required to solving the spatial features of the 3D object, such as the Height channel, Width channel, and Depth channel. In addition, the Depth channel spatial feature can also be transferred to a Disparity channel spatial feature.

Based on the observation that a 3D object in the left-view and right-view images has the similar appearance and pixel values, using one single backbone network is capable of extracting abundant features. One backbone network in the share network of SNFU according to the exemplary embodiment is used for feature extraction for a paired of images as:

$$F_{LR} = \mathcal{T}(I_L, I_R; W),  \quad (1)$$

where $F_{LR}$ represents the one or more extracted fused features, $I_L$ represents the left view image, $I_R$ represents the right view image, W represents the learned parameters of the single backbone network $\mathcal{T}(.)$ of SNFU.

In comparison to the two-stream network, the channels of images are fused to generate one or more fused images 201 so as to be processed by the share network of SNFU. The fused images 201, also called stacked images, can be generated by concatenating the channels of the left and the right view images along respective channel dimensions. After the concatenation operation, the fused images 201 have the concatenated channel dimensions in form of Red color channel of the left view image, Red color channel of the right view image, Green color channel of the left view image, Green color channel of the right view image, Blue color channel of the left view image, and Blue color channel of the right view image, in sequence. Therefore, in the embodiment of present disclosure, the fused images 201 with six channel dimensions are taken as input of the share network of SNFU, which is different from the configuration that the two-stream network takes an image with three channel dimensions (RGB channels of one image). In the input convolutional block of the backbone network of SNFU, the convolutional kernels are modified with six channels instead of three. It can be easily found that the share network of SNFU can reduce about 50% computation consumption of previous methods. It is noted that each of the input convolutional block 211 and one or more downsampling convolutional blocks have at least one convolutional layer.

In step 320, the fused features are extracted from the fused images 201 by the single backbone network 210 of the share network of SNFU. It is noted that the backbone network is selected from, for example, many convolution neutral networks (CNN), such as, full convolution neutral networks, such as ResNet, VGG, DenseNet, search-based network, etc.

The backbone network 210 comprise an input convolutional block 211, and one or more downsampling convolutional blocks, such as 212, 213, and 214. The input convolutional block 211 receives the input of one or more fused images 201. The one or more downsampling convolutional blocks are configured to generate fused features based on the output of the input convolutional block 211. Each of the downsampling convolutional blocks generates the image features with different spatial sizes. For example, the downsampling convolutional block 212 generates image features with ½ of the spatial sizes of the output images of the input convolutional block 211, which is identical to the spatial size of the left and right view images, the downsampling convolutional block 213 generates image features with ¼ of the spatial sizes of the left and right view images, which is ½ of the spatial sizes of the output of the previous downsampling convolutional block 212, and the downsampling convolutional block 214 generates image features with ⅛ of the spatial sizes of the left and right view images, which is ½ of the spatial sizes of the output of the previous downsampling convolutional block 213. The smaller the spatial size is, the more global features are focused. The downsampling degrees of the downsampling convolutional blocks and/or the number of the downsampling convolutional blocks can be selected with other values according to demands. The fused features comprise all of the image features with different spatial sizes outputted by the one or more downsampling convolutional blocks 212, 213, and 214, and the fused features contain both information for left and right view images.

To better describe the 3D object detection process, the exemplary backbone network 210 of SNFU is configured, for example, with three downsampling convolutional blocks. The convolutional block configuration of backbone network 210 can be adjusted to meet the practical demands, such as a configuration of one input convolutional block and two downsampling convolutional blocks, a configuration of one input convolutional block and four downsampling convolutional blocks, etc.

After the fused images generation by the single backbone network 210, the fused features are unmixed to a left view-aware feature and a right view-aware feature by the feature unmixing sub-network 220 of the SNFU, in step 330.

Since the one or more extracted fused features from the fused images contain both the information for the left view image and the information for the right view image, they need to be unmixed. To generate view-aware features, i.e., separate the fused features to the left view features $F_L$ and right-view features $F_R$, for 3D object prediction, the fused features are unmixed as:

$$F_L, F_R = \mathcal{U}(F_{LR}; W_U),  \quad (2)$$

where $\mathcal{U}(; W_u)$ represents the feature unmixing operation with learnable parameters $W_U$ of the feature unmixing sub-network 220 of SNFU. In an embodiment, the feature unmixing sub-network 220 is constructed, for example, by convolution neutral networks, such as, full convolution neutral networks. The feature unmixing sub-network 220 comprises two modules as described below.

Figure 4A:
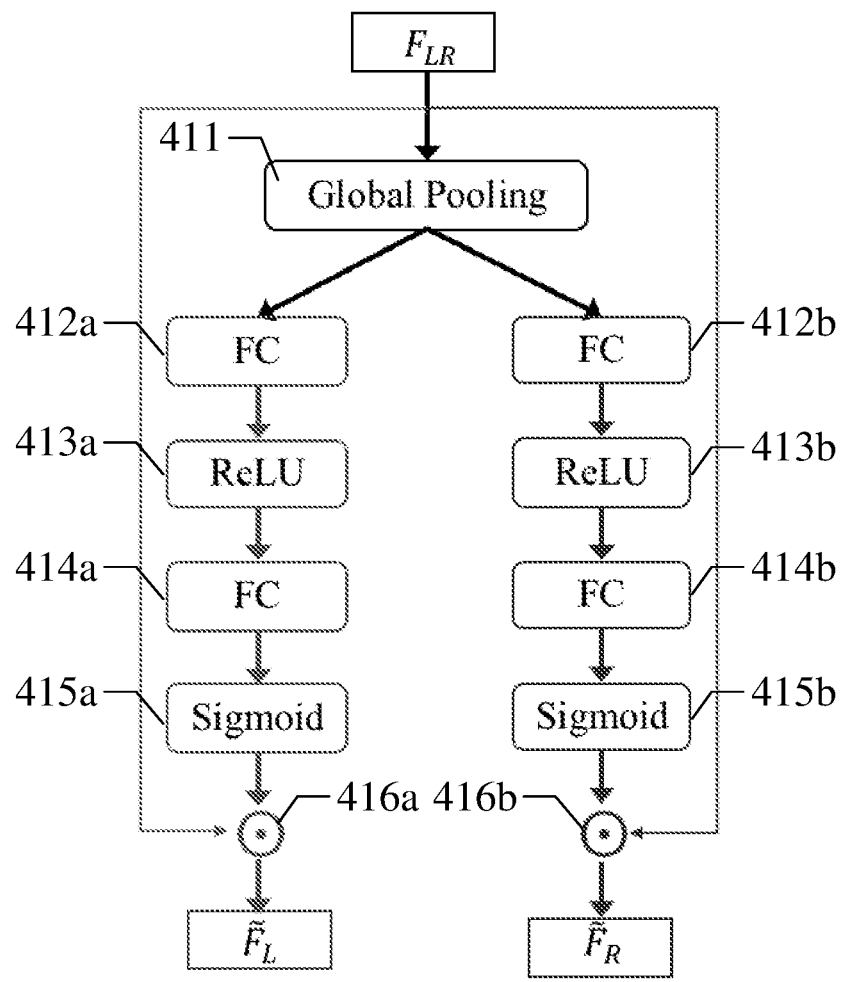
FIG. 4A illustrates the structure of a self-feature unmixing module (SFUM) of the feature unmixing sub-network of the SNFU according to an exemplary embodiment of present disclosure.

FIG. 4A illustrates the structure of the self-feature unmixing module (SFUM) of the feature unmixing sub-network 220 of the SNFU according to an exemplary embodiment of present disclosure. The SFUM is configured to generate left initial view-aware features and right initial view-aware features based on the fused features outputted by the single backbone network 210.

To unmix the extracted fused features to view-aware features, the SFUM separates the channel information based on the consideration that different channels have different emphasis on different views. As shown in FIG. 4A, SFUM first uses a global average pooling layer 411 performing the global average pooling operation $\mathcal{G}(.)$ to generate the channel response values, i.e., the global size image features. Since the fused features outputted by the downsampling convolutional blocks 212 to 214 comprise a plurality of image features with different spatial sizes, the SFUM needs to perform the global average pooling operation to each of the image features. In FIG. 2, SFUMs 2201a, 2202a, and 2203a, and SFUMs 2201b, 2202b, and 2203b correspond to the outputs from downsampling convolutional blocks 212 to 214, respectively, where "a" and "b" in the last character of the reference numbers identify the type of images, for example, SFUM 2201a performs the pooling operation to the image feature from the convolutional block 212 corresponding to the left view image, and SFUM 2201b performs the pooling operation to the image feature from the convolutional block 212 corresponding to the right view image, etc. Therefore, the upper part 220a of the feature unmixing sub-network 220 corresponds to the part for left view images, and the lower part 220b of the feature unmixing sub-network 220 corresponds to the part for right view images. This definition of types "a" and "b" is used to identify the left and right view images throughout the context of the description.

Then two branches are used to reweight the channel information for left view and right view images, respectively as:

$$\tilde{F}_L = \mathcal{U}_{SFUM_L}(\mathcal{G}(F_{LR}); W_{SFUM_L}; \odot), \tilde{F}_R = \mathcal{U}_{USFUM_R}(\mathcal{G}(F_{LR}); W_{SFUM_R}; \odot),$$  (3)

where $\mathcal{U}_{SFUM_L}$ means the SFUM for left view image with learnable weights $W_{SFUM_L}$, and $\mathcal{U}_{SFUM_R}$ means the SFUM for right view image with learnable weights $W_{SFUM_R}$. The left branch corresponds the feature unmixing to the global size image features for the left view image, and the right branch corresponds the feature unmixing to the global size image features for the right view image. The structure and processing of the SFUM will explained with the left branch below.

The left branch may have one or more fully connected (FC) layers, such as 412a and 414a, to reweight the corresponding channel information of the global size image features of the left view image, one or more ReLU layers and one or more sigmoid functions. In an example embodiment, a ReLU layer 413a is placed behind the first FC layer 412a and prior to the second FC layer 414a, and the activation function of sigmoid function 415a is placed behind the second FC layer 414a to range the values to (0,1).

$\odot$ represents the element-wise multiplication operation 416a. The different channels of the global size image features derived from the fused features $F_{LR}$ are element-wise multiplied by the fused features, respectively, to reweight different channels of the fused features $F_{LR}$ so as to generate $\tilde{F}_L$ as the left initial view-aware features and $\tilde{F}_R$ as the right initial view-aware features. For example, regarding the output of the convolutional block 212 corresponding to the fused feature with ½ of the spatial sizes of the output images of input convolutional block 211, $\odot$ of SFUM 2201a element-wise multiplies the Red, Green, and Blue color channels of the left view image in the global size image features by the Red, Green, and Blue color channels of the left view image in the fused features $F_{LR}$ respectively, to generate the Red, Green, and Blue color channels of the left view image of the left initial view-aware features. SFUM 2201b performs the similar generation for the right initial view-aware feature regarding the same spatial size as SFUM 2201a. The other SFUMs 2202a/2202b, 2203a/2203b correspond to respective generations of left and right view-aware features regarding different spatial sizes. That is, SFUM uses a learning-based method to reweight the channel information based on the input fused features from the backbone network 210.

The FC layers, ReLU layer, activation function, and the element-wise multiplication operation in the right branch of SFUM for the right view image are similar and will not be described in details again.

Figure 4B:
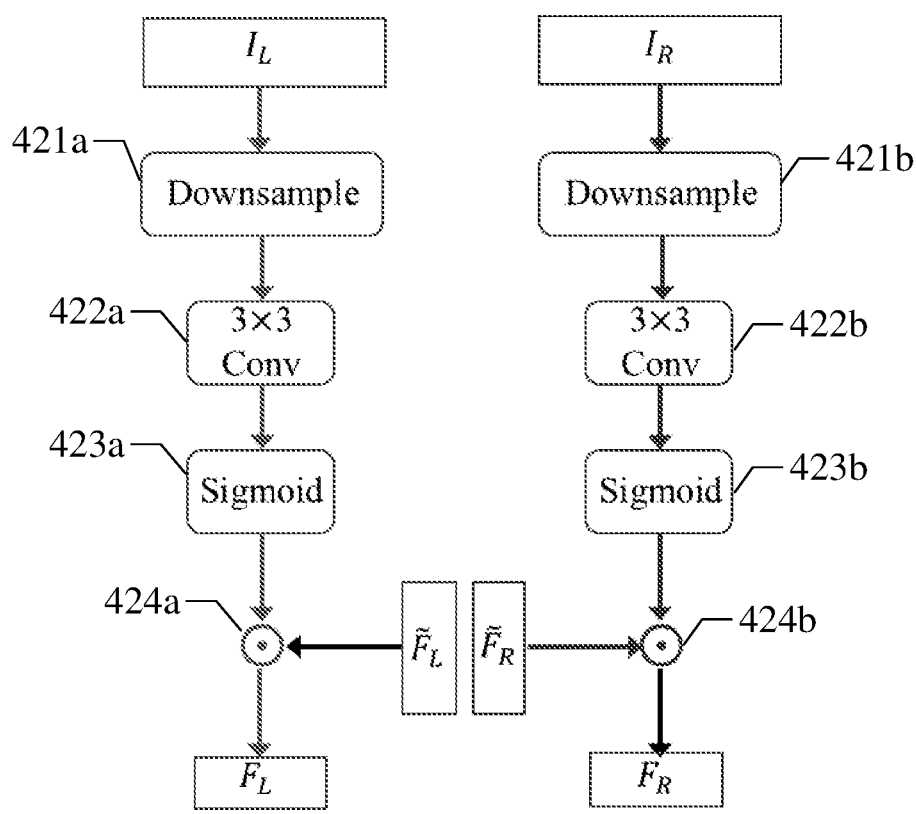
FIG. 4B illustrates the structure of a guided-feature unmixing module (GFUM) of the feature unmixing sub-network of the SNFU according to an exemplary embodiment of present disclosure.

Considering, that only reweighting the channel information cannot completely solve the spatial position mixing problem, a guided-feature unmixing module (GFUM) is introduced for generating the view-aware features so as to further unmix the spatial information, after getting the initial view-aware features $\tilde{F}_L$ and $\tilde{F}_R$. FIG. 4B illustrates the structure of the guided-feature unmixing module (GFUM) of the feature unmixing sub-network 220 of the SNFU according to an exemplary embodiment of present disclosure.

Because the left view and right view images have different information for 3D object position, they are used to guide the feature unmixing as:

$$F_L = \mathcal{U}_{GFUM_L}(I_L; \tilde{F}_L; W_{GFUM_L}; \odot), F_R = \mathcal{U}_{GFUM_R}(I_R; \tilde{F}_R; W_{GFUM_R}; \odot),$$  (4)

where $\mathcal{U}_{GFUM_L}$ and $W_{GFUM_R}$ represent the GFUM for left view and right view with corresponding learnable weights, respectively.

The GFUM is designed for each of the left and right view images. As shown in FIG. 4B, the left part corresponds to the GFUM structure for left view image, wherein each of the reference numbers has a last character of "a", and the right part corresponds to the GFUM structure for the right one with last character of "b". For example, for the left view image part, the GFUM uses a downsampling layer 421a to downsample the left view image, i.e., the single view image of the paired images, to match the spatial size with the initial view-aware feature $\tilde{F}_L$. For example, GFUM 2211a needs to downsampling the left view image $I_L$ to the spatial size of ½ of the spatial sizes of the left view image which is the same as the spatial size of the image feature outputted by the convolutional block 212, since the initial view-aware feature output by the SFUM 2201a also has ½ of the spatial sizes of the left view image. GFUMs 2212a and 2213a downsample the left view image by same degree of the spatial size as SFUM 2202a and 2203a respectively.

Still illustrated with the left part of FIG. 4B, GFUM uses one or more convolution layers with different kernels, for example, a convolutional layer 422a with 3×3 kernels, to generate a left spatial gate. The left spatial gate generated by the left view image has the spatial position information for 3D objects in left view image. The spatial position information is inputted into the activation function Sigmoid 423a and then element-wise multiplied by the left initial view-aware feature $\tilde{F}_L$ to generate left view-aware feature $F_L$. That is, the element-wise multiplication operation 424a between the left spatial gate and the left view image extracts the spatial position information relative to the left view image in the fused features to finish the feature unmixing. The element-wise multiplication operation 424a is similar to the operation 416a in SFUM and will not be detailed again. GFUMs 2212a and 2213a perform similar feature unmixing functions as GFUM 2211a.

For the right part of FIG. 4B, GFUM 2211b downsamples the right view image with downsampling layer 421b, uses one or more convolution layers with different kernels, for example, convolutional layer 422b with 3×3 kernels, to generate a right spatial gate, and element-wise multiplies the output of the activation function Sigmoid 423b by the right initial view-aware feature $\tilde{F}_R$ to generate right view-aware feature $F_R$, so as to extract the spatial position information relative to the right view image in the fused features to finish the feature unmixing. GFUMs 2212b and 2213b perform similar feature unmixing functions as GFUM 2211b.

In fact, different sides of view images have invalid spatial correlations. Based on the spatial correlation characteristics between the view images of the left and the right and the initial view-aware feature of the view image of left and right, the result of the element-wise multiplication operation for different view images will be excluded and only the result for same side is kept. Therefore, the multiplication operations in SFUM and GFUM are only applied to the channels of the corresponding features of same view image.

From another view, the feature unmixing sub-network comprising SFUMs and GFUMs can be considered as many sub-units corresponding to different spatial sizes relative to the output of the convolutional blocks in the backbone network 210 for both the left and the right view images, each of which has a SFUM structure and a GFUM structure.

After the left and right view-aware features $F_L$ and $F_R$ for all of the downsampling convolutional blocks 212, 213, and 214 are generated, they are used for 3D object prediction, in step S340, where the prediction comprises left prediction 230a and right prediction 230b. The 3D object prediction is performed by prediction heads. As the details of the prediction heads are not the emphasis of present disclosure, they can be selected based on the previous solutions known.

In step S350, the method for 3D object detection according to an exemplary embodiment of present disclosure determines the spatial features of the 3D object predicted in the 3D object prediction, such as, by solving the 3D box 240, to output final results. The 3D box of object can be defined by the spatial features of width, height, and depth of the 3D object.

SNFU is a deep CNN method. Thus, before the 3D object detection solution including the share network of SNFU, prediction heads, and the unit for solving the 3D box is used, for example, the share network of SNFU is used for extracting the fused features generated from the paired images and/or for unmixing the fused features to left and right the view-aware features, the network of SNFU is trained based on training data set to optimize the parameters.

Firstly, the architecture of SNFU is designed. The design work comprises the architecture of the backbone network (i.e. a feature extractor network), SFUMs, GFUMs, prediction heads, and the spatial feature determination unit for solving the 3D box. Among that, the typical architectures, such as ResNet, VGG, DenseNet, and search-based networks can be adopted as the backbone network. SFUMs and GFUMs can be designed according to the introduction with reference to FIGS. 4A and 4B. The prediction head can be adopted as specified in previous 3D object detection methods.

After designing the basic architecture of SNFU, we can prepare a set of training data including view images and their ground truth for supervised training. Because the networks are trained deeply using a lot of training samples, data augmentation operation like image flipping, and adding Gaussian noise can be adopted for better effect.

Regarding the parameter initialization, the network can be trained from scratch or by using pre-training weights for fine-tuning. If training the network from scratch, the parameters in the SNFU can be initialized randomly by Gaussian, Xavier or other methods in deep CNN. If a pre-trained network is provided, the weights in the convolutional layers of the input convolutional block 211 can be copied and pasted to meet the input demands.

Based on above preparation work, the share network of SNFU is trained by forward propagation and backward propagation iteratively. During the training, loss functions can be designed as previous 3D object detection methods. The parameter optimization can also adopt algorithms like SGD or Adam iteratively until convergence.

Figure 5:
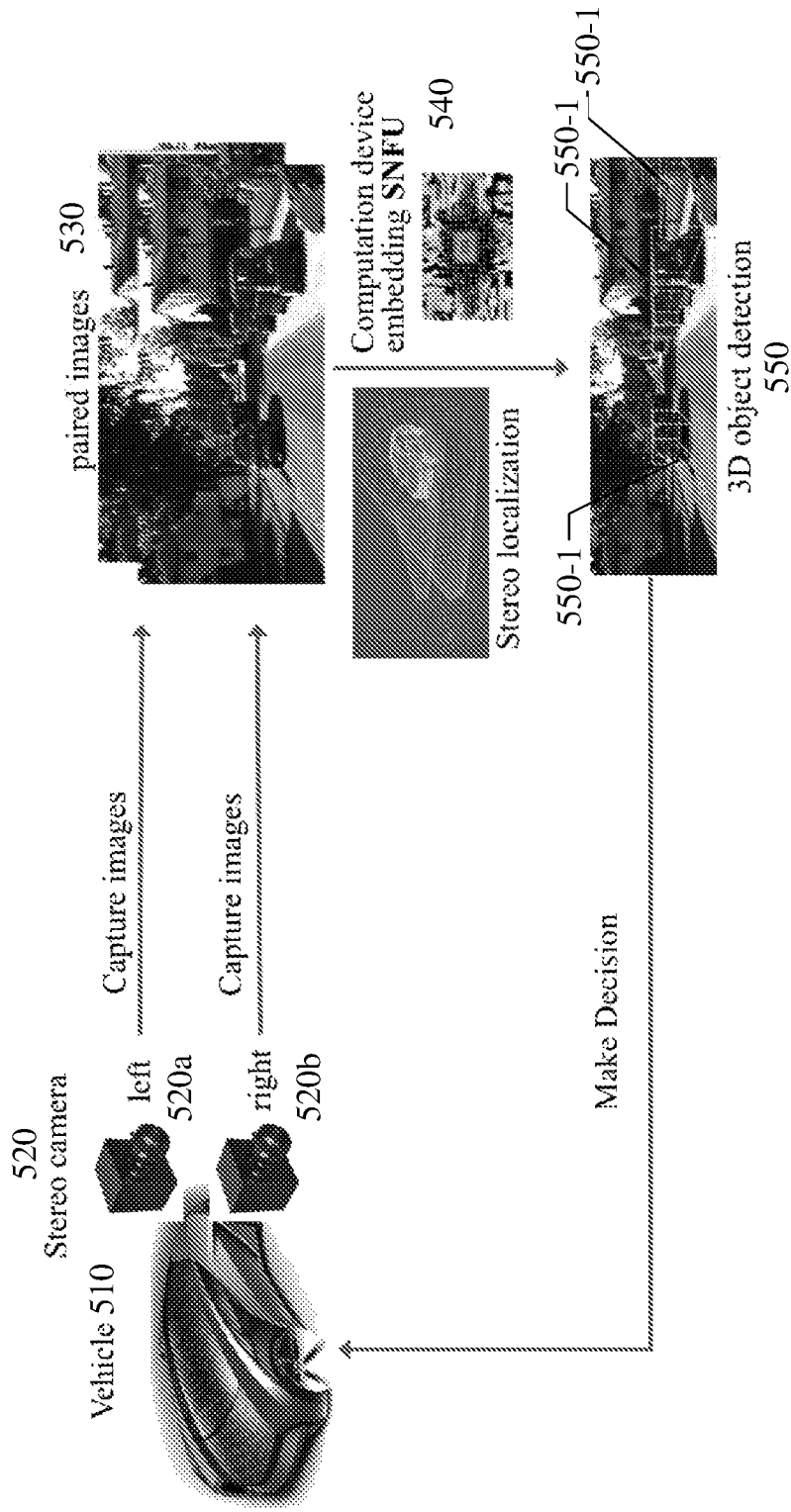
FIG. 5 illustrates the application for autonomous driving by the 3D object detection via the share network of SNFU according to an exemplary embodiment of present disclosure.

FIG. 5 shows the application for autonomous driving by the 3D object detection via the share network of SNFU according to an exemplary embodiment of present disclosure. Vehicle 510 has a stereo camera system 520 comprising a left camera 520a and a right camera 520b. Each of the cameras captures view images to generate paired images 530 which contain the 3D information of the objects. After being inputted into the onboard computation device embedding SNFU 540 of present disclosure, the 3D object detection and stereo localization operation transform the paired images 530 to a stereo image with 3D boxes indicating the detected 3D objects as shown by the rectangle boxes 550-1. Then the autonomous driving unit or the driver of vehicle 510 can use the detection result to make decision for driving assistance.

The following shows experiments for binocular-based 3D object detection with SNFU according to exemplary embodiments of present disclosure vs. previous detection solutions.

KITTI dataset is chosen for evaluating the performance of the proposed 3D object detection with SNFU. KITTI dataset, in which 3D information of objects is provided for evaluation, is collected in practical driving scenes for autonomous driving research. The experimental share network of SNFU uses a ResNet-101 network to make a fair comparison with previous state-of-the-art solution with Stereo-RCNN network. The detection precision (using AP3d under 0.7 IoU metric in easy, moderate, and hard subsets, higher is better), and computation complexity (using GFlops, lower is better) are presented in Table 1. As can be seen, the 3D object detection solution of present disclosure can reduce the computation complexity by about 50% of that in baseline solution with Stereo-RCNN network while achieving the similar even better detection precision.

TABLE 1

Detection performance and computation comparison

| Solution | AP 3d | | | Gflops |
| --- | --- | --- | --- | --- |
| | easy | moderate | hard | |
| Stereo-RCNN | 54.11 | 36.69 | 31.07 | 502.45 |
| SNFU | 55.02 | 38.23 | 32.35 | 261.79 |

In the step of S350, the detected 3D object can be represented by the solved spatial features of width channel, height channel, and depth channel. These spatial features define the location information of the 3D objects, for example, by a rectangle with the solved width, height, and depth. According to an exemplary embodiment of present disclosure, the 3D box solving manner can be further improved.

Depth estimation is a classical computer vision problem which describes the distance between observation point and 3D objects. In the situation of autonomous driving, getting the information of depth can avoid the accident of autonomous vehicle crashing into car and pedestrian. Meanwhile, the depth information is also helpful in 3D object detection and segmentation tasks. Therefore, the accuracy and the speed are two important points which the researchers concern the most.

Figure 6:
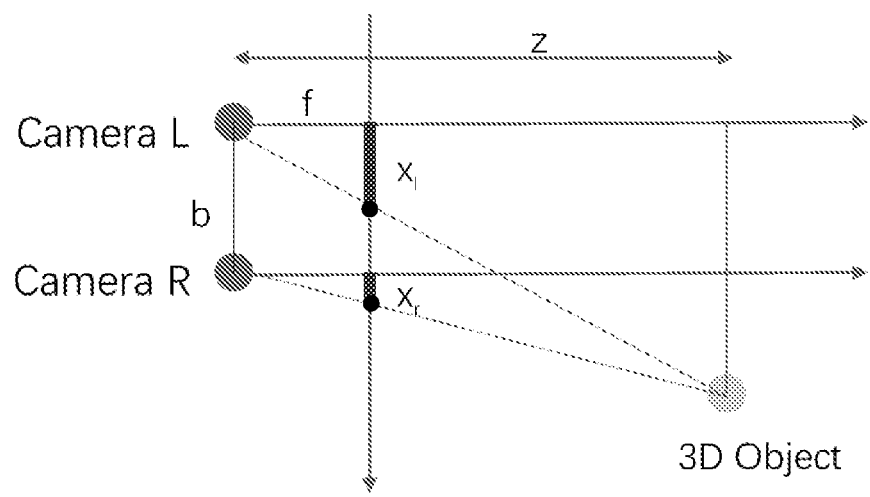
FIG. 6 illustrates the fundamental of stereo depth estimation according to an exemplary embodiment of present disclosure.

FIG. 6 is the fundamental of stereo depth estimation for 3D object by using stereo camera. The pair of cameras, Camera L as the left camera and Camera R as the left camera, of the stereo camera device capture the stereo view images of 3D object which is the target of depth estimation. The points on the vertical axis are the observed images in left and right view of the 3D object obtained by left and right camera. According to the principle of similar triangle, the depth "z" of the 3D object away from the stereo camera can be easily determined by the relevant distance between the two cameras "b", the focus of the cameras "f", and the disparity between the images in the left and right view, $x_l$–$x_r$. Since b and f are easy to get, the depth estimation problem for 3D object detection turns to be a disparity estimation problem.

There are several existing depth estimation methods based on deep learning which are DispNet, GCNet, PSMNet, and GANet, for example. DispNet is the first end-to-end network for depth estimation. The method uses deep convolutional layers to extract the feature maps of left and right view images and then concatenate them together, and finally refines the concatenated features to get the predict disparity. However, the accuracy of DispNet is not good enough. GCNet involves feature extraction, cost volume and cost aggregation into an end-to-end CNN network which achieves high accuracy. Cost volume is a 4D tensor with the size of (max_disparity, channel, height, width). To deal with cost volume, the cost aggregation with many 3D convolution operation has to be involved which cost a lot of computation. PSMNet uses pyramid feature extraction and stacked hourglass block with 25 3D convolutional layers to improve the performance of the network. Similar to GCNet, the problem in PSMNet is the too much computation cost by 3D convolution operation. GANet uses a Semi-Global Guided Aggregation(SGA) model and a Local Guided Aggregation(LGA) model which achieve the state-of-the-art performance in depth estimation task, where the method uses different amount of SGA to balance the accuracy and efficiency.

In order to improve the speed of depth estimation without decrease the accuracy, the exemplary embodiment of present disclosure proposes a Paired Channel (abbreviated as "PC") Cost Volume Network (called as PCNet) which uses a cross concatenate operation with a 3D convolution layers to learn the correlation between left and right view images. The depth estimation for 3D object involves a 2D convolutional refinement instead of the 3D cost aggregation used, for example, in GCNet, PSMNet, and GANet.

Figure 7:
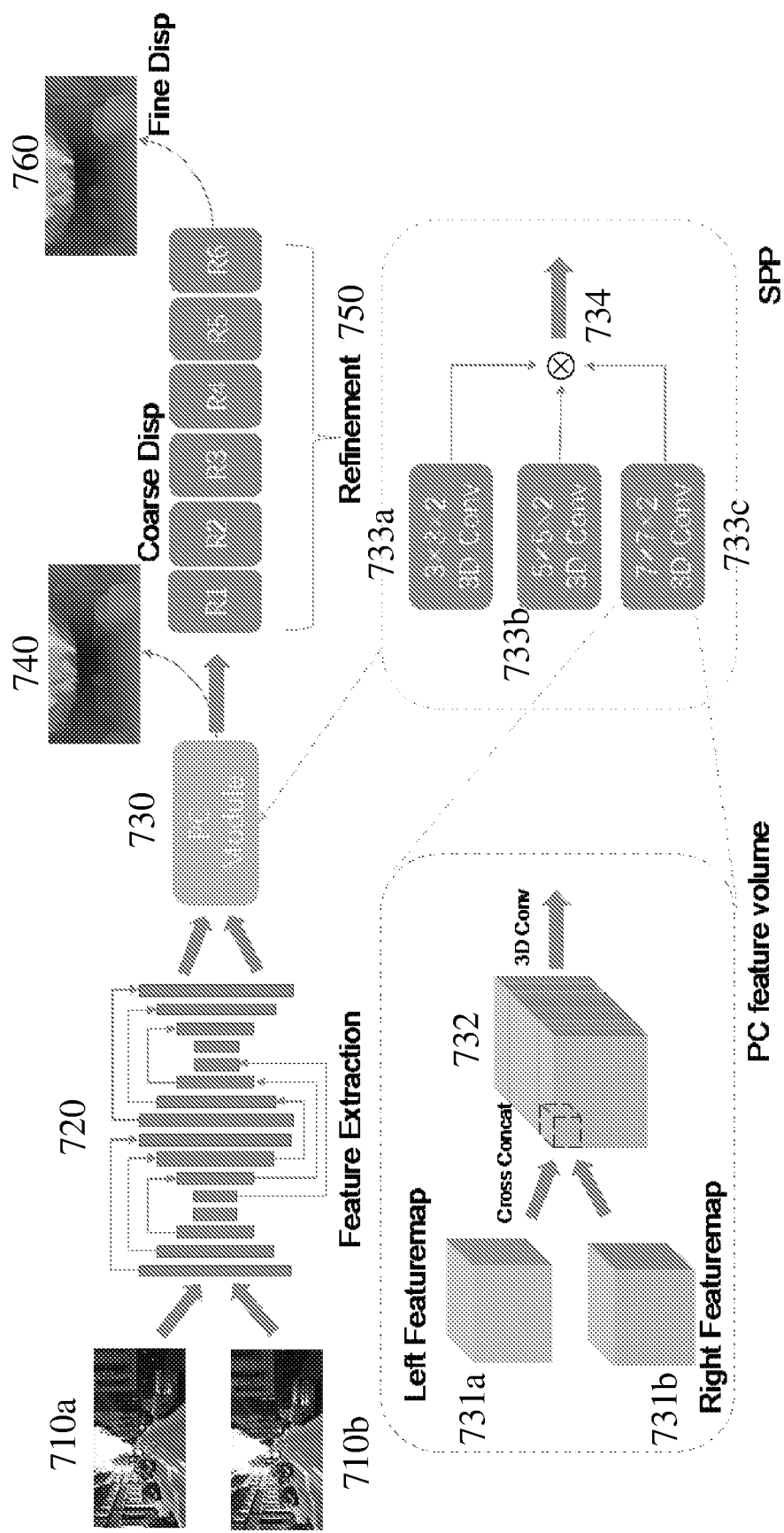
FIG. 7 illustrates a diagram of a framework of the paired channel cost volume network (PCNet) according to an exemplary embodiment of present disclosure.

FIG. 7 illustrates a diagram of a framework of the paired channel cost volume network (PCNet), as a 3D object localization approach, according to an exemplary embodiment of present disclosure. The proposed PCNet contains three main parts which are feature extraction sub-network 720, paired channel (PC) module 730, and refinement module 750.

The feature extraction sub-network 720 extracts feature maps of the pair of the view images, i.e., the left view image 710a and right view images 710b which corresponding to the left and right view images of the pair of the view images 201 as shown in FIG. 2. Compared to the inputted view images of FIG. 2, the 3D objects are identified or predicted in the left and right view images 710a and 710b, for example, by the 3D object prediction operation 230a and 230b as mentioned above. The inputs of the feature extraction sub-network 720 are shown by the solid lines 1041a in FIG. 10. The left and right view images 710a and 710b have the spatial information of the predicted 3D object. The feature extraction sub-network 720 can use two stacked hourglass structure with dense connection which are capable of extracting the feature maps of the left and right images effectively. The convolutional neutral network structure of two stacked hourglass structure with dense connection is known in previous method, for example, the two stacked hourglass structure can be based on a PSMNet and/or a simplified PSMNet or the other networks for depth estimation. The output of the feature extraction sub-network 720, i.e., the feature map 731a of the left view image and the feature map 731b of the feature map of the right view image, are fed to PC module 730. The feature maps 731a, 731b of the left and right view images may comprise the width and height of the 3D object, and the RGB color channel information of the left and right view images 710a and 710b additionally, that is, the feature maps 731a and 731b comprises two channels of spatial information of width and height of 3D object, and three channels of color information representing the 3D spatial information additionally.

The lower part of FIG. 7 shows the details of the Paired Channel module (PC module) 730. The PC module 730 is the core of the PCNet method which has a Spatial Pyramid Pooling (SPP) structure with three parallel Paired Channel (PC) feature volumes 732. PC feature volume 732 is constructed by one channel from the feature map 731a of the left view image and the corresponding channel from the feature map 731b of the right view image along the respective channel dimensions of the feature maps of the left and right view images. The way of forming PC feature volume 732 is named as "Cross Concat". For example, firstly for width channel, the width information in the width channel of the feature map 731a of the left view image 710a and the width information in the width channel of the feature map 731b of the right view image 710b are concatenated into the concatenated width channel; then for the height channel, the height information in the height channel of the feature map 731a of the left view image 710a and the height information in the height channel of the feature map 731b of the right view image 710b are concatenated into the concatenated height channel; and then for the RGB color channels, the RGB information in the RGB channels of the feature map 731a of the left view image 710a and the RGB information in the RGB channels of the feature map 731b of the right view image 710b are concatenated into the concatenated RGB channels respectively in sequence of R-G-B; finally for the whole channels, the concatenated width, height, and RGB channels are concatenated into the PC feature volume 732 respectively in sequence of width-height-RGB. Such cross concat operation can keep the information belonging to different channels not being interfered when performing the convolution and get the correlation between the channels of the feature maps of left and right view images instead of the feature inside the channels.

Then the PC feature volumes 732 are outputted to three small 3D convolutional filters 733a, 733b, and 733c, which is called as Paired Channel Filter (PC Filter), with the size of (k, k, 2) and the stride of (1, 1, 2), where k in the size (k, k, 2) represents different spatial sizes to extract the information about depth, and 2 in the size (k, k, 2) represents the spatial relationship between two corresponding channels, i.e., the one channel of the feature map 731a of the left view image 710a and the corresponding channel of the feature map 731b of the right view image 710b with respect to same channel, such as height channel, for same 3D object. In FIG. 7, it shows three PC filter of sizes (3×3×2), (5×5×2), and (7×7×2), which means the PC module 730 processes the spatial relationship between the channel information of the pair of view images with three spatial sizes. The stride can be selected based on actual demands. The PC filters 733a to 733c are constructed by small 3D convolutional layers to reduce the computation complexity. Then the outputs of three 3D convolutional layers are concatenated together to form the Spatial Pyramid Pooling structure, and a nonlinear function 734, such as activation function Sigmoid, activates the results of convolution. The design of the PC filters makes sure that the filters only generate the correlation between the feature maps of the left and right view images without involving the inner feature information. The PC module 730 outputs a coarse disparity 740 of the 3D object as display in the view images.

In refinement module 750, at least one stacked residual block, such as six stack residual blocks, R1, R2, . . . , R6 in FIG. 7, are used for refining the coarse disparity 740 to a fine disparity 760 as display in the view images. According to an exemplary embodiment, the refinement module 750 is constructed by 2D convolutional layers which save a lot of computation compared with the cost aggregation with 3D convolutional layers used in GCNet, PSMNet and GANet. As for supervision, the output of PC module 730 and the output of refinement module 750 can be combined together to generate the final prediction of fine disparity.

The PCNet may further comprise a transform module to transform the fine disparity to the depth of the 3D object according to the similar triangle theory abovementioned.

Alternatively, in an exemplary embodiment of the present disclosure, the PCNet can also use the fused features extracted by the single backbone network 210 of the SNFU network in FIG. 2, or use the left and right view-aware features unmixed by the feature unmixing sub-network of the SNFU network in FIG. 2 as the left and right feature maps outputted to the PC module 730. Therefore, the function of the feature extraction sub-network 720 can be performed by the shared network of SNFU, especially the single backbone network of the SNFU, i.e., the fused features outputted by the backbone network 210 of SNFU or the left and right view-aware features outputted by the GFUM of SNFU are directly applied to the PC module 730 as the left and right feature maps 730a and 730b, as shown by the dotted lines of 1042b in FIG. 10. In addition, the 3D object prediction information on the image segmentation in prediction operation 230a and 230b is also used in the PC module 730.

The PCNet, as a convolutional neutral network, is trained based on a training data set before it is used for determining the disparity of 3D object. Following is an exemplary training method for PCNet. In the data preparation step of the training process, the training images with disparity labels of 3D objects are provided. Since the disparity labels obtained by LiDAR are sparse, a mask method can be used as preprocessing.

In the architecture step for the PCNet, the feature extraction sub-network 720 of two stacked hourglass structure with dense connection is configured to extract the feature maps of the left and right view images. After that, PC module 730 is configured to learn the correlation between the feature maps 731a and 731b of the left and right view images to get the coarse disparity. Then the refinement module 750 is configured to deal with the output of PC module 730 in order to get fine disparity as the final prediction of disparity is configured. In specific, the PC filters of the PC module 730 are selected as three 3D convolutional layers with the sizes of 3×3×2, 5×5×2, 7×7×2 and a stride of (1, 1, 2), and concatenated together to be activated for generating the coarse disparity.

Based on the training data set, the parameters of the network PCNet established are optimized. The parameters of the convolutional layers of PC filters and the parameters of the activation function f are obtained by minimizing the mean squared error of the training data set. The standard back-propagation algorithm can be used for solving the minimization problem. In the back-propagation algorithm, the gradients of the mean squared error with respect to the parameters of the PC filters and parameters of the activation function f are computed and back-propagated. The back-propagation algorithm is conducted in several epochs until convergence. To fasten the training, PCNet network can be trained on Scene Flow dataset as a pretrain, then be fine-tuned on KITTI 2015 dataset for autonomous driving.

After many steps of training, the final weights can be used to test the performance of depth prediction from images in testing dataset. The test computes EPE Error and Error Rate to evaluate the performance of the network.

In the experiments, Scene Flow dataset is chosen as the pretrain dataset for its large amount of stereo image. KITTI 2015 is chosen as the finetune dataset because it is the real-world street scene with fine labeled stereo images. An ablation study is performed and the experimental result of the PCNet is also compared with the state-of-the-art algorithm GANet. The comparison results are shown in Table 2 as follows:

TABLE 2

Results of experiment on KITTI 2015 Validation dataset

| Method | Input Resolution | Pretrain | 3D Conv 3 × 3 × 2 | 5 × 5 × 2 | 7 × 7 × 2 | EPE Error | Error Rate | Time(s) |
|---|---|---|---|---|---|---|---|---|
| DispNet | 300 × 1000 | Yes | — | — | — | 1 | 4.65% | 0.05 |
| GANet-1 | 300 × 1000 | Yes | — | — | — | 0.7 | 3.21% | 0.06 |
| GANet-15 | 384 × 1248 | Yes | — | — | — | — | 2.71% | 0.36 |
| PCNet | 384 × 1248 | No | Yes | No | No | 1.85 | 12.90% | 0.11 |
| PCNet | 384 × 1248 | Yes | Yes | No | No | 0.83 | 2.90% | 0.11 |
| PCNet | 384 × 1248 | Yes | Yes | Yes | No | 0.77 | 2.80% | 0.11 |
| PCNet | 384 × 1248 | Yes | Yes | Yes | Yes | 0.75 | 2.68% | 0.12 |

From the table 2, it can be seen that the proposed PCNet achieves competitive accuracy and higher speed compared with other methods. Row five shows the importance of pretrain. Rows six to eight show the effectiveness of SPP structure.

Figure 8:
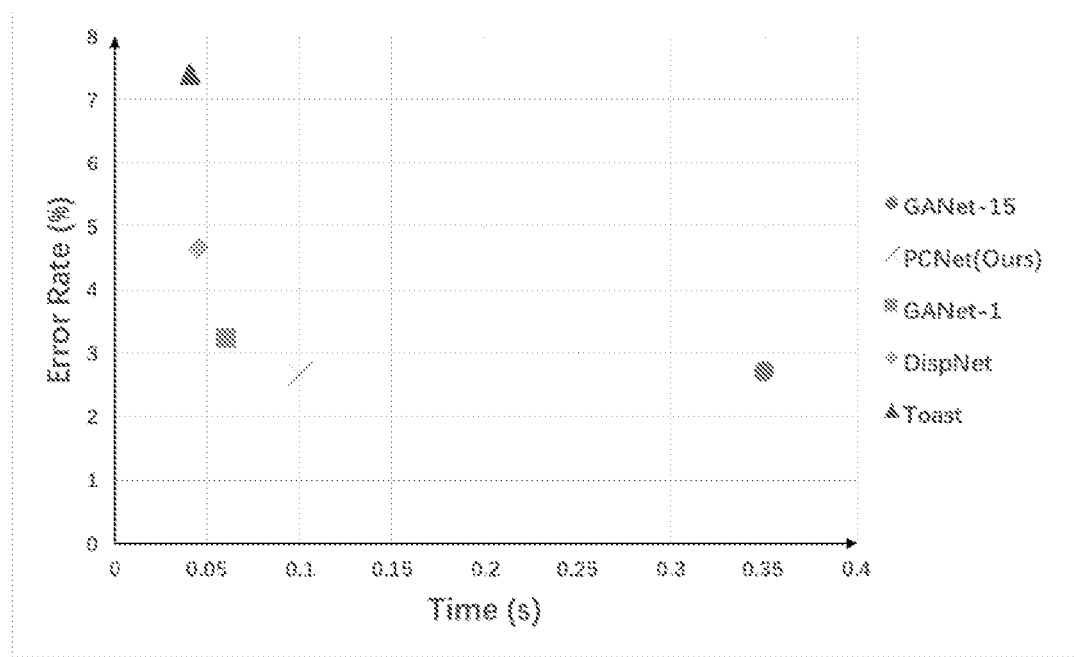
FIG. 8 illustrates the result of comparison between PCNet and other method according to an exemplary embodiment of present disclosure.

FIG. 8 illustrates graph on the result of comparison between PCNet and other method according to an exemplary embodiment of present disclosure. From the intuitive comparison between PCNet and other stereo depth estimation methods, it can be concluded that the proposed PCNet (marked by cross) gains better Error Rate compared with GANet-1, DispNet, and Toast. The proposed PCNet has similar Error rate but higher speed compared with GANet-15.

The following table 3 is the comparison of GFLOPS and parameter between PCNet and GANet. Index of GFLOPS is the computation cost of the network and index of parameter is the size of the network. According to the two indexes, the proposed PCNet has smaller size compared with GANet. That is why PCNet achieves higher speed.

TABLE 3

| GFLOPS and parameter comparison between PCNet and GANet | | |
| --- | --- | --- |
| Method | GFLOPS | parameter |
| GANet-15 | 1109 | 4.48M |
| PCNet | 116 | 2.64M |

Figure 9:
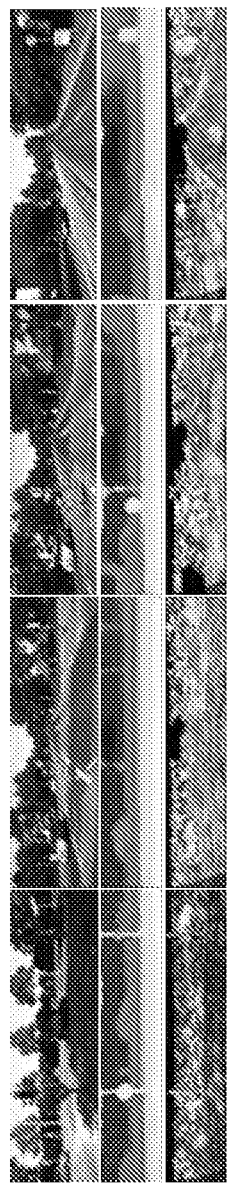
FIG. 9 illustrates the predicted depth of PCNet on KITTI 2015 dataset according to an exemplary embodiment of present disclosure.

FIG. 9 illustrates the predicted depth of PCNet on KITTI 2015 dataset. The upper row is original image. The middle row is the predicted depth (yellow, green red and blue mean the distance from small to large). The lower row is the difference between the predicted depth estimation and labels (the cooler color is better).

Figure 10:
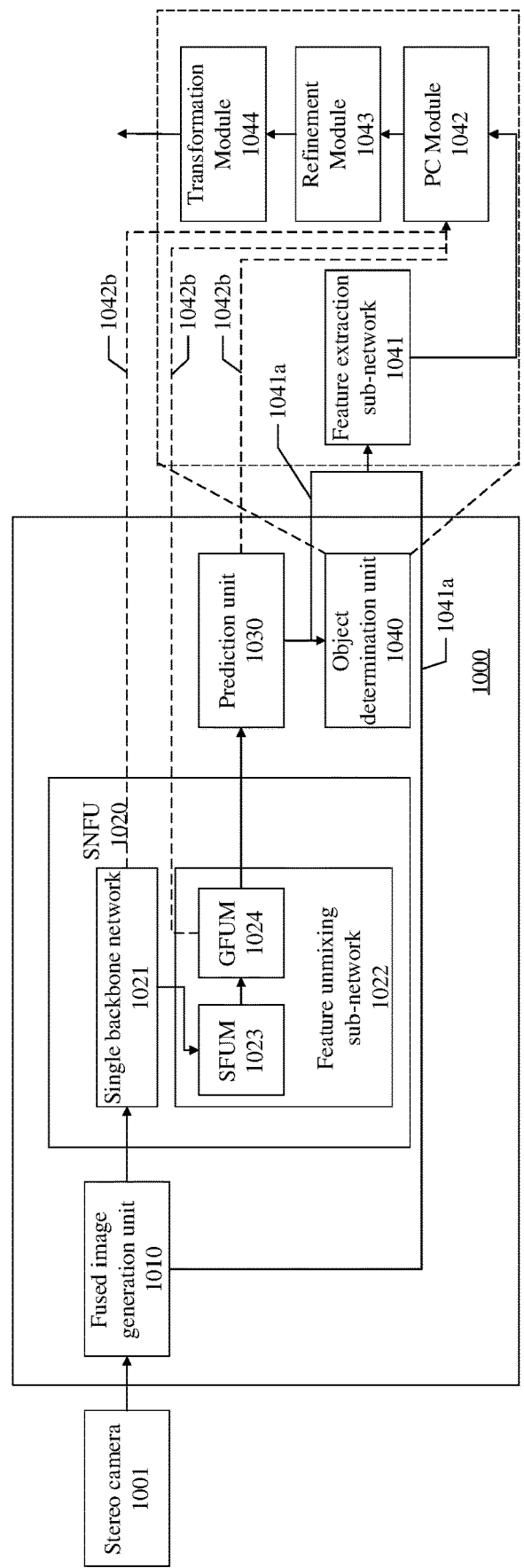
FIG. 10 illustrates a block diagram of a device for 3D object detection according to an exemplary embodiment of present disclosure.

The present disclosure also provides a device for 3D object detection, as shown in FIG. 10. The device 1000 comprises a fused image generation unit 1010, a share network with feature unmixing (SNFU) 1020, a prediction unit 1030, and optional an object determination unit 1040.

The fused image generation unit 1010 is configured to generate one or more fused images based on a pair of images, the pair of images including a left view image and a right view image, obtained from a stereo camera 1001, e.g. two still image cameras or two video cameras. The fused images are generated by concatenating the channels of the left and right view images along respective channel dimensions.

The SNFU 1020, as the main network structure of the device, comprises a single backbone network 1021 configured to extract one or more fused features from the pair of images and a feature unmixing sub-network 1022 configured to unmix the fused features to a left view-aware feature and a right view-aware feature. The feature unmixing sub-network 1022 further comprises SFUM 1023 and GFUM 1024. The detail structures of the backbone network 1021 and the SFUM 1023 and GFUM 1024 are described above with reference to the framework in FIG. 2, where the SFUM 1023 has a first multiplication sub-unit to perform the element-wise multiplication operation 416a and/or 416b in FIG. 4A, and the GFUM 1024 has a second multiplication sub-unit to perform the element-wise multiplication operation 424a and/or 424b in FIG. 4B.

The prediction unit 1030 is configured to predict the 3D object based on the left view-aware feature and the right view-aware feature.

The optional object determination unit 1040 is further configured to determine spatial features of the predicted 3D object. In an embodiment, the object determination unit 1040 is further configured as a PCNet structure comprising a Feature extraction sub-network 1041, a PC module 1042, a refinement module 1043, and a transformation module 1044.

Comparing with previous binocular based 3D object detection solutions, the proposed 3D object detection with share network of SNFU according to embodiment of present disclosure has the following advantages:

In the 3D object detection with SNFU, only a share backbone network is used for feature extraction of paired images, which is much more efficient than adopting two networks for feature extraction. Such architecture of single backbone network can dramatically reduce the computation complexity and improve the detection efficiency, which promotes the practical application of stereo vision. Features for left view and right view images are interacted in the backbone network and separated by using SFUM and GFUM. This mechanism guarantees the view-aware prediction and accurate detection performance.

In addition, the 3D object detection with SNFU can be developed into multi-view system in which several paired images are processed simultaneously. The share network of SNFU can effectively control the computation complexity, while previous method, especially the two-stream network scheme, will double and redouble the computation complexity linearly.

Furthermore, the PCNet proposed by the exemplary embodiment of present disclosure can achieve the competitive performance on accuracy and high speed simultaneously when predicting the depth of the 3D object, so as to achieve better performance in the autonomous driving system.

Figure 11:
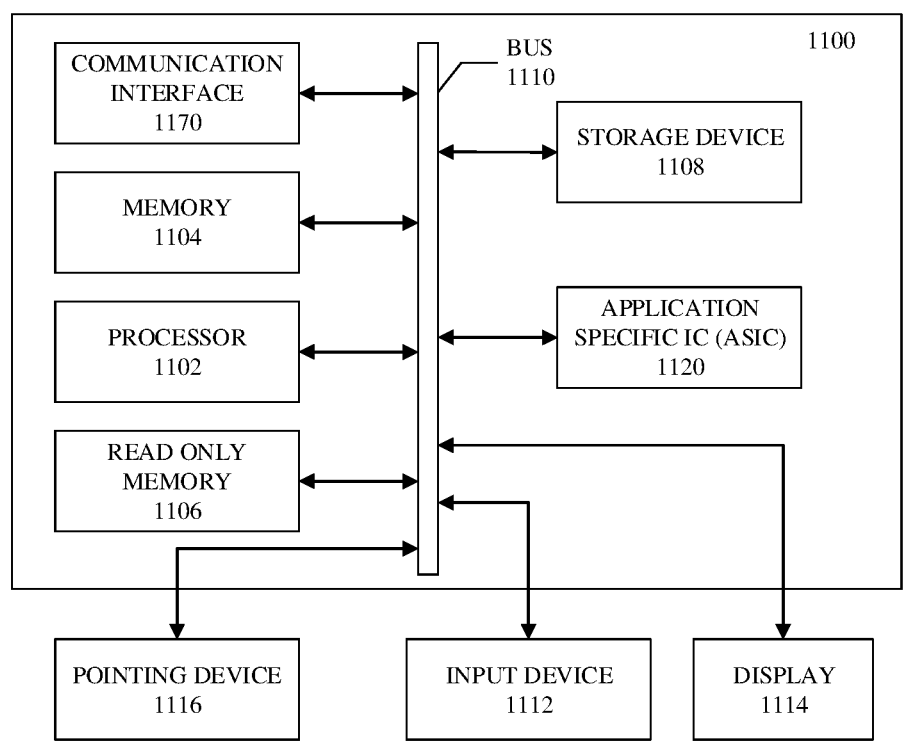
FIG. 11 illustrates a computer system upon which an exemplary embodiment of present disclosure can be implemented.

FIG. 11 illustrates a computer system, apparatus or device 1100 upon which an exemplary embodiment of the disclosure can be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is designed and is programmed (e.g., via computer program code or instructions) for decentralized trust evaluation in a distributed network as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. Computer system 1100, or a portion thereof, constitutes a means for performing one or more steps of security and trust technologies and solutions in virtualized networks. The computer system, apparatus or device 1100 can be, can be implemented in, can be embedded in, can be communicatively attached to, can be communicatively connected to, for example, a vehicle, a vehicle electronic control unit (ECU), a mobile phone, a mobile communication device, a game device, a smart glasses, a camera element, a video camera, a still image camera, a personal computer, a service device, or any combination thereof.

A bus 1110 includes one or more parallel conductors of information so that information is transferred quickly among devices coupled to the bus 1110. One or more processors and/or circuitries 1102 for processing information are coupled with the bus 1110.

The stereo camera to capture the pair of the view images can be directly connected to the bus 1110 so as to transfer the view images to other devices coupled to the bus 1110. Alternatively, the stereo camera can also communicate with the computer system, apparatus or device 1100 via the communication interface 1170 as described below.

A processor 1102 performs a set of operations on information as specified by computer program code related to the decentralized trust evaluation in a distributed network as described herein. The computer program code is a set of instructions or statements providing instructions for the operation of the processor and/or the computer system to perform specified functions. The code, for example, can be written in a computer programming language that is compiled into a native instruction set of the processor. The code can also be written directly using the native instruction set (e.g., a machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors can be implemented as mechanical, electrical, magnetic, optical, chemical or quantum components, among others, alone or in combination.

As used in this application, the term circuitry may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation."
This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Computer system 1100 also includes a memory 1104 coupled to bus 1110. The memory 1104, such as a random access memory (RAM) or other dynamic storage device, stores information including processor instructions for decentralized trust evaluation in a distributed network as described herein. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for decentralized trust evaluation in a distributed network as described herein, is provided to the bus 1110 for use by the processor from an external input device 1112, such as a keyboard containing alphanumeric keys operated by a human user, or a sensor. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

The units in device 1000 of FIG. 10 can be stored in the read only memory 1106, or the storage device 1108 as function modules comprising sets of instructions in form of computer program codes, such as software, firmware, and/or combination thereof. These function modules are read into memory 1104 and executed by the processor 1102 to perform the corresponding functionalities as mentioned above. The executions of these function modules can also be performed in the ASIC 1120 for its greater operational performance for special purpose. During the training process for the network, the user can also input the training data set and modify the training parameters via the input device 1112.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general, the coupling is with a network link that is connected to a local network to which a variety of external devices with their own processors are connected. For example, communication interface 1170 can be a parallel port or a serial port or a universal serial bus (USB) port on a personal computer. In some embodiments, communications interface 1170 is an integrated service digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 can be a local area network (LAN) card to provide a data communication connection to a compatible LAN, such as Ethernet. Wireless links can also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communication interface 1170 includes a radio band electromagnetic transmitter and receiver called a radio transceiver. In certain embodiments, the communication interface 1170 enables connection to virtualized networks for decentralized trust evaluation in a distributed network as described herein.

The term "computer-readable medium" as used herein refers to any medium that participates in providing information to processor 1102, including instructions for execution. Such a medium can take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

At least some embodiments of the disclosure are related to the use of the computer system or apparatus 1100 for implementing some or all of the techniques described herein. According to one embodiment of the disclosure, those techniques are performed by computer system 1100 in response to one or more processors 1102 executing one or more sequences of one or more processor instructions contained in one or more memories 1104. Such instructions, also called computer instructions, software and program code, can be read into memory 1104 from another computer-readable medium such as storage device 1108 or network link. Execution of the sequences of instructions contained in memory 1104 are configured to cause processor 1102 to perform one or more of the method steps described herein. In alternative embodiments, hardware, such as ASIC 1120, can be used in place of or in combination with software to implement the invention. Thus, embodiments of the invention are not limited to any specific combination of hardware and software, unless otherwise explicitly stated herein.

Some example embodiments of the disclosure relating to the computer system or apparatus 1100 can be implemented in a system, an apparatus or a device comprising at least one processor, and at least one memory including computer program code, the at least one memory and the computer program code configured to, with the at least one processor, cause the apparatus at least to perform the various functions as described relating to the FIGS. 1-5, 7 and 10.

The signals transmitted over network link and other networks through communications interface 1170, carry information to and from computer system 1100. Computer system 1100 can send and receive information, including program code, through the networks, through communications interface 1170. The received code can be executed by processor 1102 as it is received, or can be stored in memory 1104 or in storage device 1108 or other non-volatile storage for later execution, or both. In this manner, computer system 1100 can obtain application program code in the form of signals on a carrier wave.

The present disclosure includes any novel feature or combination of features disclosed herein either explicitly or any generalization thereof. Various modifications and adaptations to the foregoing exemplary embodiments of this disclosure can become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method, comprising:
   generating one or more fused images based on a pair of images, the pair of images including a left view image and a right view image;
   extracting one or more fused features from the fused images by a single backbone network;
   unmixing the fused features to a left view-aware feature and a right view-aware feature;
   predicting a 3D object based on the left view-aware feature and the right view-aware feature; and
   determining one or more spatial features of the predicted 3D object.

2. The method according to claim 1, wherein the pair of the images is obtained by a stereo camera.

3. The method according to claim 1, wherein generating the one or more fused images based on the pair of the images further comprises:
generating the one or more fused images by concatenating the channels of the left and right view images along respective channel dimensions.

4. The method according to claim 1, wherein the backbone network comprises an input convolutional block and one or more downsampling convolutional block which are connected in sequence, the input convolutional block being configured to receive the fused images, the downsampling convolutional block, each of which comprises at least one convolutional layer, being configured to generate fused features comprising image features with different spatial sizes.

5. The method according to claim 1, wherein unmixing the fused features to the left view-aware feature and the right view-aware feature further comprises:
generating left initial view-aware features and right initial view-aware features based on the fused features; and
generating left view-aware features and right view-aware features based on the left initial left view-aware features and the right initial view-aware features.

6. The method according to claim 5, wherein generating the left initial view-aware features and the right initial view-aware features based on the fused features further comprises:
extracting global size image features from the fused features by a global average pooling operation and full convolution operations; and
generating the left initial view-aware features and the right initial view-aware features by reweighting different channels of the global size image features.

7. The method according to claim 5, wherein generating the left view-aware features and the right view-aware features based on the left initial left view-aware features and the right initial view-aware features further comprises:
downsampling the left and right view images according to the spatial sizes of the image features of the fused features, respectively;
generating spatial position information for the 3D object in the left and right view images respectively; and
generating the left and right view-aware features, based on the spatial position information for the 3D object in the left view image and the right view image, and the left initial view-aware features and the right initial view-aware features, respectively.

8. The method according to claim 7, wherein,
the left view-aware features are generated by element-wise multiplying the spatial position information for the 3D object in the left view image by the left view image, and
the right view-aware features are generated by element-wise multiplying the spatial position information for the 3D object in the right view image by the right view image.

9. The method according to claim 1, wherein the one or more spatial features of the 3D object comprise a height, a width, and a depth of the 3D object, determining spatial features of the predicted 3D object further comprises:
determining the depth of the 3D object based on the height and the width of the 3D object predicted in the left and right view images.

10. The method according to claim 1, wherein the 3D object detection is implemented in a vehicle.

11. The method according to claim 1, wherein the 3D object detection is implemented in a mobile communication device.

12. An apparatus comprising:
at least one processor; and
at least one memory storing instructions that, when executed by the at least one processor, cause the apparatus at least to:
generate one or more fused images based on a pair of images, the pair of images including a left view image and a right view image;
extract one or more fused features from the pair of images and a feature unmixing sub-network configured to unmix the fused features to a left view-aware feature and a right view-aware feature;
predict a 3D object based on the left view-aware feature and the right view-aware feature; and
determine one or more spatial features of the predicted 3D object.

13. The device according to claim 12, wherein the paired of images is obtained by a binocular imaging unit.

14. The device according to claim 12, further caused to generate the fused images by concatenating the channels of the left and right view images along respective channel dimensions.

15. The device according to claim 12, wherein the backbone network comprises an input convolutional block and one or more downsampling convolutional block which are connected in sequence, the input convolutional block being configured to receive the fused images, the one or more downsampling convolutional block, each of which comprises at least one convolutional layer, being configured to generate fused features comprising image features with different spatial sizes.

16. The device according to claim 12, further caused to:
generate left initial view-aware features and right initial view-aware features based on the fused features; and
generate left view-aware features and right view-aware features based on the left initial left view-aware features and the right initial view-aware features.

17. The device according to claim 16, further caused to element-wise multiply the global size image features by the fused features, respectively, to reweight the different channels of the global size image features.

18. The device according to claim 12, further caused to:
downsample the left and right view images according to the spatial sizes of the image features of the fused features, respectively;
generate spatial position information for the 3D object in the left and right view images respectively; and
generate the left and right view-aware features based on the spatial position information for the 3D object in the left and right view image and the left initial view-aware features and the right initial view-aware features, respectively.

19. The device according to claim 18, further caused to:
element-wise multiply the spatial position information for the 3D object in the left view image by the left view image to generate the left view-aware features; and
element-wise multiply the spatial position information for the 3D object in the right view image by the right view image to generate the right view-aware features.

20. The device according to claim 12, wherein the one or more spatial features of the 3D object comprise a height, a width, and a depth of the 3D object, further configured to determine the depth of the 3D object based on the height and the width of the 3D object predicted in the left and right view images.

21. The device according to claim 12, further caused to:
extract feature maps of the left and right view images from the left and right view images;
generate a coarse disparity based on the channels of the feature maps of the left and right view images;
refine the coarse disparity to a fine disparity; and
transform the fine disparity to the depth of the 3D object.

22. A non-transitory computer-readable medium comprising instructions which, when executed by an apparatus, cause the apparatus to perform at least the following
generating one or more fused images based on a pair of images, the pair of images including a left view image and a right view image;
extracting one or more fused features from the fused images by a single backbone network;
unmixing the fused features to a left view-aware feature and a right view-aware feature;
predicting the 3D object based on the left view-aware feature and the right view-aware feature; and
determining one or more spatial features of the predicted 3D object.

* * * * *